US 8,165,621 B2

(12) United States Patent
Norman

(10) Patent No.: US 8,165,621 B2
(45) Date of Patent: *Apr. 24, 2012

(54) MEMORY EMULATION IN A CELLULAR TELEPHONE

(75) Inventor: Robert Norman, Pendleton, OR (US)

(73) Assignee: Unity Semiconductor Corporation

( * ) Notice: Subject to any disclaimer, the term of this patent is extended or adjusted under 35 U.S.C. 154(b) by 673 days.

This patent is subject to a terminal disclaimer.

(21) Appl. No.: 11/974,034

(22) Filed: Oct. 10, 2007

(65) Prior Publication Data

US 2009/0098901 A1    Apr. 16, 2009

(51) Int. Cl.
| H04M 1/00 | (2006.01) |
| H04M 3/42 | (2006.01) |
| G06F 13/00 | (2006.01) |
| G06F 13/14 | (2006.01) |
| G06F 13/36 | (2006.01) |
| G11C 5/02 | (2006.01) |
| G11C 5/06 | (2006.01) |
| G11C 19/08 | (2006.01) |

(52) U.S. Cl. .............. 455/550.1; 455/414.1; 710/110; 710/305; 710/306; 710/308; 710/311; 365/51; 365/63; 365/23

(58) Field of Classification Search ............. 455/550.1, 455/414.1; 710/110, 305, 306, 308, 311; 365/51, 53, 23
See application file for complete search history.

(56) References Cited

U.S. PATENT DOCUMENTS

| 6,034,882 A | 3/2000 | Johnson et al. |
| 6,088,262 A * | 7/2000 | Nasu ........................ 365/185.04 |
| 7,327,600 B2 | 2/2008 | Norman |
| 7,460,385 B2 | 12/2008 | Gruber et al. |
| 7,496,810 B2 * | 2/2009 | Hara .............................. 714/721 |
| 7,519,754 B2 * | 4/2009 | Wang et al. .................... 710/110 |
| 2003/0151959 A1 | 8/2003 | Tringall et al. |
| 2004/0157638 A1 * | 8/2004 | Moran et al. ............... 455/550.1 |
| 2006/0146145 A1 * | 7/2006 | Kawamoto ................ 348/226.1 |
| 2006/0155919 A1 | 7/2006 | Lasser et al. ................... 711/103 |
| 2007/0101040 A1 * | 5/2007 | Feldstein et al. ............. 710/306 |
| 2007/0150691 A1 * | 6/2007 | Illendula et al. ............. 711/170 |
| 2008/0005459 A1 | 1/2008 | Norman |
| 2008/0057918 A1 * | 3/2008 | Abrant et al. .............. 455/414.1 |
| 2008/0084727 A1 | 4/2008 | Norman |
| 2009/0016094 A1 * | 1/2009 | Rinerson et al. ............. 365/148 |
| 2010/0277962 A1 * | 11/2010 | Norman .......................... 365/51 |
| 2011/0026291 A1 * | 2/2011 | Norman .......................... 365/51 |

OTHER PUBLICATIONS

U.S. Appl. No. 11/893,644, filed Aug. 16, 2007, Robert Norman.
U.S. Appl. No. 11/893,647, filed Aug. 16, 2007, Robert Norman.
U.S. Appl. No. 11/897,726, filed Aug. 31, 2007, Robert Norman.
U.S. Appl. No. 11/897,909, filed Aug. 30, 2007, Robert Norman.
U.S. Appl. No. 11/449,105, filed Jun. 8, 2006, Robert Norman.

* cited by examiner

Primary Examiner — Bobbak Safaipour

(57) ABSTRACT

A cellular telephone using a memory array that is directly addressed and non-volatile is disclosed. The memory array can be used to replace and emulate multiple memory types such as DRAM, SRAM, non-volatile RAM, FLASH memory, and a non-volatile memory card, for example. The memory array may be randomly accessed. Data stored in the memory array is retained in the absence of electrical power. One or more memory arrays may be used in the cellular telephone. At least one of the memory arrays may be in the form of a removable memory card.

23 Claims, 7 Drawing Sheets

MEMORY EMULATION IN A CELLULAR TELEPHONE

FIELD OF THE INVENTION

The present disclosure relates to electronic systems. More specifically, the present disclosure relates to memory technology in a cellular telephone.

BACKGROUND

Memory is required for any device that stores instructions and/or data. Memory can either be classified as volatile or non-volatile. Volatile memory is memory that loses its contents when the power is turned off. In contrast, non-volatile memory may not require a continuous power supply to retain information. Non-volatile memories may use solid-state memory devices as memory elements.

One type of volatile memory is random access memory or RAM. As the name suggests, RAM may be accessed in any order so long as the address, or intersecting row (word line) and column (bit line), of the desired cells are known.

There are several kinds of RAM. One type is dynamic random access memory or DRAM. DRAM is named for its refresh operation. In DRAM, a transistor and capacitor are used to create a memory cell. The capacitor holds electrons that represent a bit of data (i.e., a 1 or a 0), while the transistor is used as a switch to read the capacitor or to change its state. However, the capacitor begins to lose the electrons immediately and uses the refresh procedure, prior to the electrons discharging past the 50% mark, to hold a state of 1. That is, the central processing unit (CPU), or a memory controller, may be used to recharge the capacitors that have a state of 1. This refreshing operation allows the capacitors to maintain that high state while actively discharging. Refreshing occurs automatically thousands of time per second, and may consume CPU time and resources.

DRAM may be configured to use Direct Memory Access (DMA) or Program Input Output (PIO) to write to the memory. DMA is a method of writing to a device without passing through a CPU. The data may be sent directly through a physical DMA channel to the memory; the CPU is not involved. In the PIO method the CPU manages the data transfer. DMA may be more efficient but the memory controller used to manage DMA is more expensive and more complex. In systems with simple data transfer it is common to use PIO since fast CPUs can rival DMA times. In systems with moving images or a large number of images it is common to use DMA.

Since the DRAM circuit is small, many bits may be stored on a single chip making DRAM relatively inexpensive. The relative inexpensiveness of DRAM accounts for its widespread use as computer system RAM. However, the refreshing operation may make DRAM less efficient and thus slower, and draw more power than other RAM types.

Another type of RAM is static random access memory, or SRAM. SRAM stores each bit of data in a flip-flop circuit. The flip-flip circuit may include a group of transistors (e.g., 4 to 6 transistors) and the corresponding wiring, taking up more space than the DRAM circuit. In some embodiments, a large current may be used to overcome the impedance of the circuit transistors and wiring. SRAM may be configured to use DMA to access the memory directly or may be configured to use PIO and use the CPU. The lack of a refresh operation makes SRAM more efficient than DRAM and contributes to its overall speed advantage over DRAM. However its larger circuit size may consume more space providing fewer memory cells per chip, making SRAM more expensive per chip than DRAM.

Rewritable non-volatile memory may be referred to as Flash memory, and uses solid state technology that can still be randomly accessed. Non-volatile RAM may use a battery to draw power to maintain the data. For example, a car radio uses non-volatile RAM to store the preset radio stations. The stored preset stations are maintained when the car is turned off, but are lost if the car battery dies. The non-volatile RAM draws power from the battery to maintain the data values. Non volatile memory cards (e.g., a SD™ card) differ from non-volatile RAM in that non-volatile memory cards do not lose data upon power loss and are removable. Neither non-volatile RAM nor non-volatile memory cards use a refresh operation. However, non-volatile RAM (e.g., FLASH) and non-volatile memory cards (e.g., a SD™ FLASH memory card) utilize an erase operation prior to writing. That is, non-volatile memory is not able to perform consecutive, or back to back, writes. Data must be erased prior to the next write. A block of data may be erased at one time using one action, or one "flash." It is from this erase process that the name "Flash memory" was drawn. The erase process also causes non-volatile FLASH RAM and non-volatile FLASH memory cards to be too slow for widespread use, but useful in certain applications, such as a portable storage option.

Thus, volatile DRAM is inexpensive, volatile SRAM is fast, Non-volatile RAM retains stored data when the power is turned off, and a non-volatile memory card is portable and retains stored data through a power loss. As a result, manufacturers may use a combination of these memory types to be able to offer users differing functionality. For example, mobile phone (e.g., a cell phone or a cellular telephone) may include several memory types that support device operation and/or data storage functions, such as DRAM, SRAM, FLASH, and EEPROM. However, mixing memory types may have drawbacks including but not limited to circuitry and software necessary to support interfacing a CPU and/or a memory controller with the various memory types, the extra PC board space required to support each memory type and its associated hardware, increased power consumption and heat dissipation created by multiple memory types, just to name a few. For portable electronic devices, reducing power consumption to extend battery life is a major design goal. There are continuing efforts to improve memory technology in mobile phones.

BRIEF DESCRIPTION OF THE DRAWINGS

The present embodiments will be readily understood by the following detailed description in conjunction with the accompanying drawings, and like reference numerals designate like structural elements.

Although the Drawings depict various examples of the invention, the invention is not limited by the depicted examples. Furthermore, the depictions are not necessarily to scale.

DETAILED DESCRIPTION

The invention may be implemented in numerous ways, including as a system, an apparatus, a method, or any combination of those ways.

A detailed description of one or more examples is provided below along with accompanying figures. The detailed description is provided in connection with such examples, but is not limited to any particular embodiment. The scope is limited only by the claims, and numerous alternatives, modifications, and equivalents are encompassed. Numerous specific details are set forth in the following description in order to provide a thorough understanding. These details are provided for the purpose of example and the described embodiments may be implemented according to the claims without some or all of these specific details. For the purpose of clarity, technical material that is known in the technical fields related to the embodiments has not been described in detail to avoid unnecessarily obscuring the description.

This disclosure describes memory emulation in a cellular telephone. In some embodiments a non-volatile memory array emulates SRAM, or DRAM, or both. In some other embodiments the non-volatile memory array emulates SRAM and non-volatile RAM. In some other embodiments the non-volatile memory array emulates SRAM, non-volatile RAM, and DRAM. In some other embodiments a second non-volatile memory array emulates a non-volatile memory card. These embodiments are for illustration only; the non-volatile memory array and/or non-volatile memory array card can emulate other types and combinations of memory as well.

The above described embodiments may be practiced with other computer system configurations including but not limited to hand-held devices, microprocessor systems, DSP systems, microprocessor-based or programmable consumer electronics, minicomputers, mainframe computers and the like. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

Figure 1:
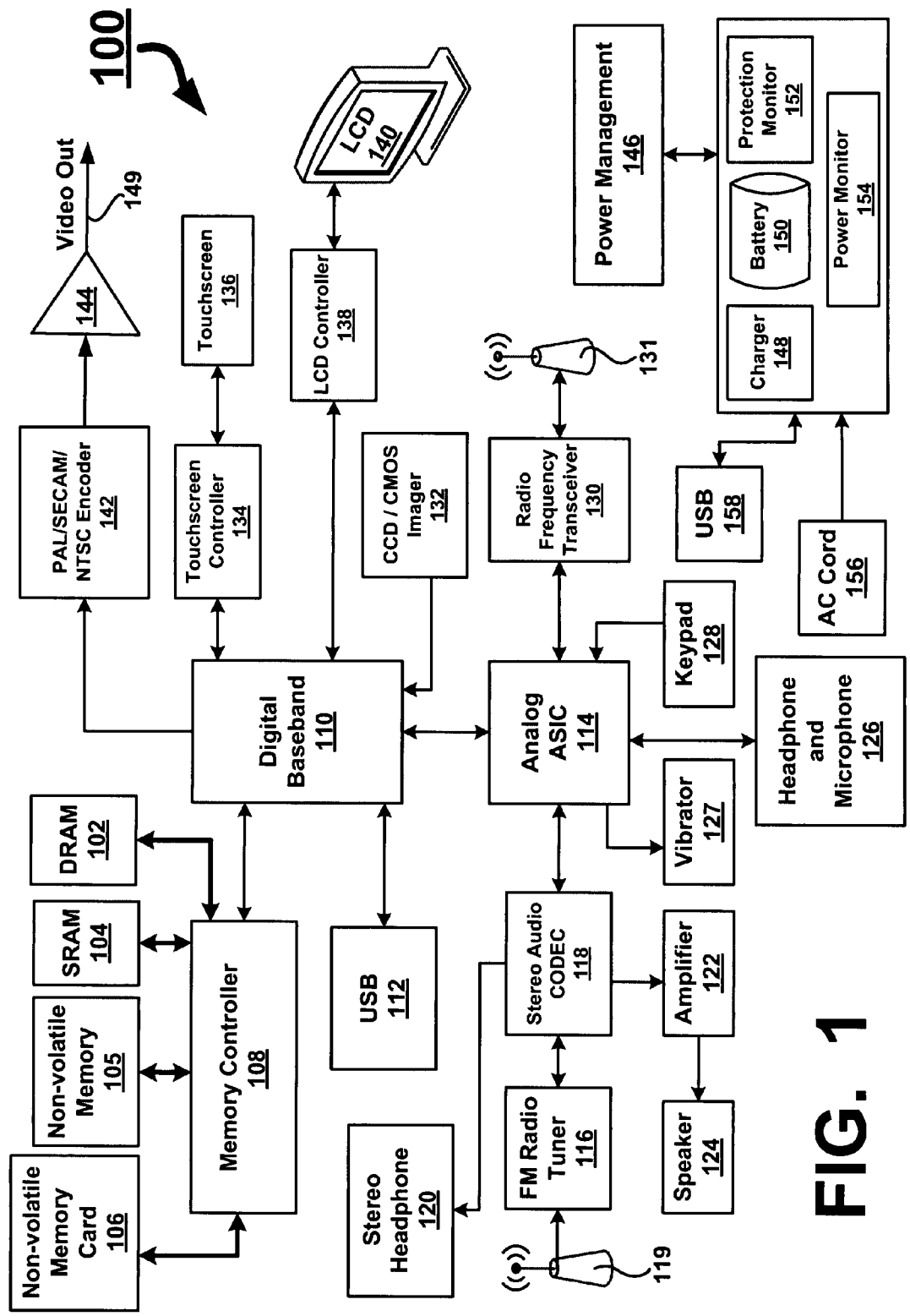
FIG. 1 is an exemplary representation of a conventional cellular telephone.

FIG. 1 is an exemplary representation of a conventional cellular telephone 100. Cellular telephones generally provide connectivity regardless of the owner's physical location. Cellular telephones may be stand alone devices, or in some embodiments, cellular telephones may be included in an electronic organizer, in a personal digital assistant (PDA), a device including electronic organizer functionality, a computer (e.g., a notebook computer), in some other type of portable electronic device, and any combination of the aforementioned devices. A cellular telephone may include various features of other electronic devices including but not limited to image capturing, email sending and receiving, voice mail, web browsing, music playback, video playback, game playing, text, picture, and video messaging, appointment tracking, and contact storing, just to name a few.

Cellular telephone 100 includes digital baseband processor 110 (digital baseband 110 hereinafter) which may be a specialized Application Specific Integrated Circuit (ASIC) that incorporates one or more microprocessors, one or more cache memories, and random logic. Digital baseband 110 manages the operation of the device. In some embodiments, digital baseband 110 may include a digital signal processor (DSP) as well. In this embodiment, the processors and the DSP may boot from the external flash and use the DRAM 102 and SRAM 104 for a temporary data store (i.e., scratch pad). In other embodiments, some of the code or operating tables may be stored in a read-only memory (ROM) within digital baseband 110.

Digital baseband 110 may be coupled to Universal Serial Bus (USB) block 112 which interfaces to the outside world. USB block 112 may handle the interfacing protocol, and the transfer and receipt of data to and from the digital baseband 110. Digital baseband 110 may send output to a video encoder 142. The video encoder 142 may encode the data to meet video signal format standards, such as PAL, NTSC, and SECAM, for example. A video driver circuit 144 can output a video out signal 149 that can be coupled to a suitable video display device. Digital baseband 110 may be coupled to other input devices as well. Digital baseband 110 may be coupled to touchscreen controller 134 which controls the data coming to and from touchscreen 136. Digital baseband 110 may be coupled to liquid crystal display (LCD) controller 138 which interfaces to LCD 140. The digital baseband 110 may also be coupled to an imager 132 providing management for moving images from the imager 132 to memory or output ports, for encoding captured images in a format such as Joint Photographic Experts Group (JPEG) files for still images and/or Moving Picture Experts Group (MPEG) for video images, and for moving the data to the analog circuitry handled by analog ASIC 114 of cellular telephone 100.

Analog ASIC 114 may be used for conversion of digital and analog signals. Analog ASIC 114 may be used as an interface between digital baseband 110 and a variety of analog devices. For example, analog ASIC 114 may be used as an interface to keypad 128, vibrator 127 (e.g., a solenoid or transducer), antennas 119 and 132, headphones and microphone 126, stereo headphone 120, and speaker 124. For example, the analog ASIC 114 may convert an analog signal from analog keypad 128 into a digital signal, and interface with the vibrator 127 to provide vibration for a silent mode of operation for cellular telephone 100. Analog signals may be input into cellular telephone 100 via antenna 119, they may go through the FM radio tuner 116, and may proceed to the stereo codec 118 before being input into analog ASIC 114 where they may be converted into a digital signal and sent to digital baseband 110. Analog ASIC 114 may drive analog output signals via radio frequency transceiver 130, and antenna 132. In some embodiments, cellular telephone 100 may include music and/or video playback features. Digital music and video files may be stored in non-volatile memory 105 or non-volatile memory card 106. The analog ASIC 114 may provide signal conditioning for driving the digital music files through stereo audio codec 118 to amplifier 122 which drives speaker 124. In other embodiments, cellular telephone 100 may transceive voice and data using a wireless protocol (e.g., Bluetooth®) via radio frequency transceiver 130 and antenna 132.

Cellular telephone 100 may include recharging circuitry. Recharging can take place via a USB adapter 158 or an analog current (AC) adapter 156. A charger 148 may be used to control battery 150 charge operations. The circuitry may include a protection monitor 152 to protect the circuitry from damage due to high or low voltage conditions. The circuitry may also include a power monitor 154 to monitor power status and inform the user. The power status indication may be displayed on LCD 140 as a bar chart, for example.

Cellular telephone 100 may include power management circuitry 146. Power management circuitry 146 may be used to reduce battery draw. Power management circuitry 146 may include a set of power switches used to turn off power to circuitry that is not active and may be controlled by digital baseband 110.

Cellular telephone 100 may use memory controller 108 to interface to the various types of memory in the system. For example, memory controller 108 may be coupled to dynamic random access memory (DRAM) 102, static random access memory (SRAM) 104, non-volatile memory (FLASH) 105, and non-volatile memory card (FLASH) 106. FLASH memory includes but is not limited to NAND Flash and NOR Flash.

Cellular telephone 100 may use read-only memory (ROM) to store the basic programs it may need for operation so that the programs stay intact even when the device is shut down or power is lost. The data and any programs added later may be stored on random-access memory (RAM) such as static random access memory (SRAM) 104, dynamic random access memory (DRAM) 102, and non-volatile memory 105. In some embodiments, data may available when the device is powered on and is kept safe by continuing to draw power from the batteries when the device is powered down. In some embodiments, cellular telephone 100 may use a non-volatile memory card 106 instead of, or in addition to, RAM.

Figure 2A:
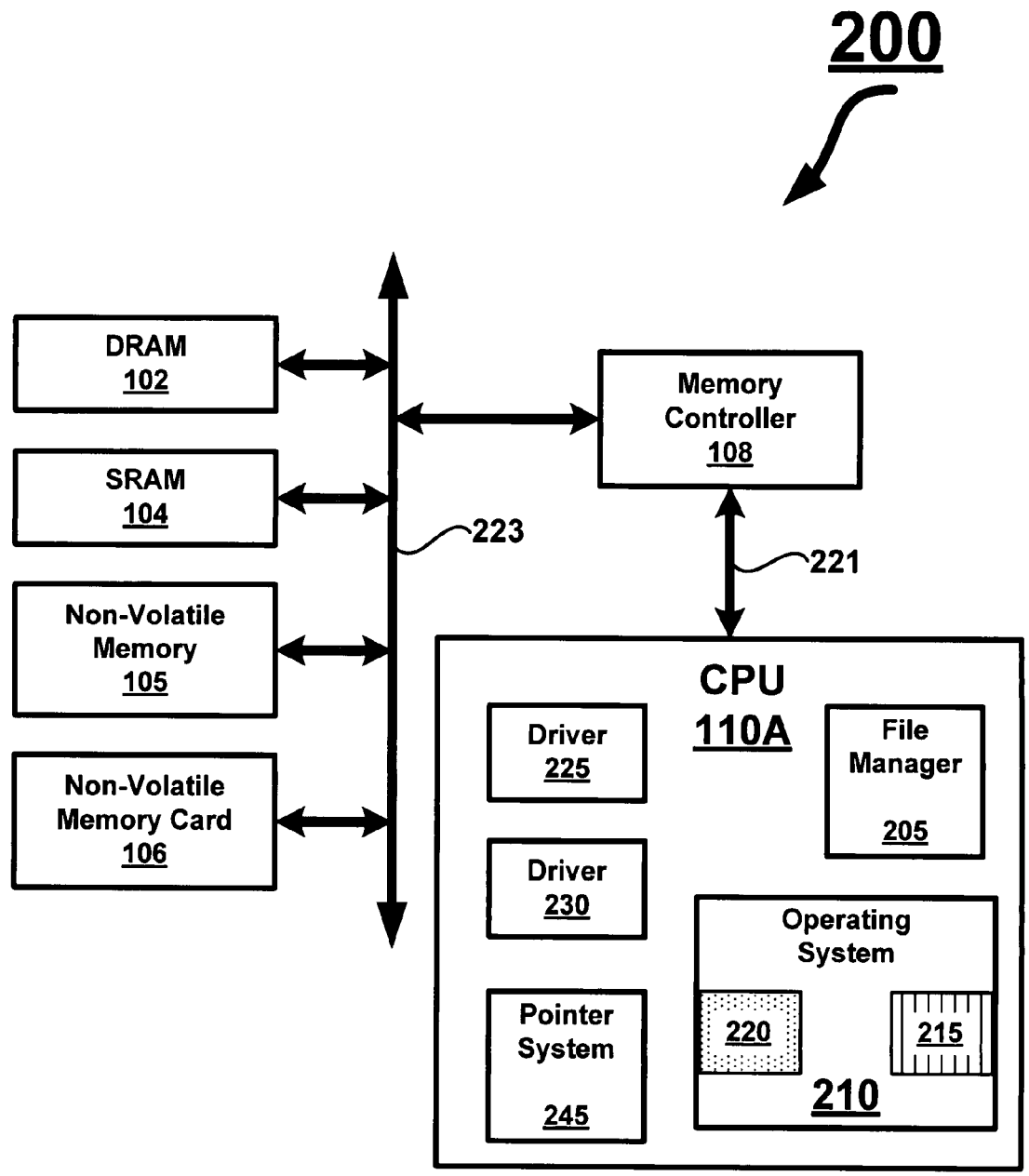
FIG. 2A is an exemplary representation of a conventional memory system of the conventional cellular telephone depicted in FIG. 1.

FIG. 2A is an exemplary representation of a conventional memory system 200 in conventional cellular telephone 100. Memory system 200 includes CPU 110A which may be one of the microprocessors located within digital baseband 110. Within the CPU 110A may be a file manager 205, an operating system 210, and a plurality of drivers 225, and 230. The file manager 205 may be configured to understand the file structure of the non-volatile memory 105 and may be used translates the data from this structure into a form CPU 110A can use (e.g., from a memory bus 223 to a CPU bus 221). CPU operating system 210 may be used to coordinate the functions in the cellular telephone 100 such as memory and I/O, possibly requiring additional drivers.

Each memory type has different infrastructure needs. DRAM 102 uses a refresh operation to maintain its data. This refresh operation may be managed by memory controller 108. The CPU 110A may coordinate the power management 146 to provide power from battery 150 to DRAM 102. In another embodiment, the refresh operation may be managed by memory controller 108. Memory controller 108 may be used to handle the interface-to-interface translation functions which translate the data from the memory bus 223 to the CPU bus 221. In some embodiments, memory controller 108 may be used to handle direct memory access (DMA) functions. DMA may speed up image storage if cellular telephone 100 includes image capturing functions (e.g., a digital camera) or moving image functions (e.g., digital video capture). In some embodiments, low power DRAM chips may be used which does reduce the power draw of the refresh operations but does not eliminate the aforementioned problems associated with DRAM refresh operations.

SRAM 104 uses a flip-flop structure instead of a capacitance circuit and does not perform a refresh operation. CPU 110A may coordinate power management 146 to provide power from battery 150 to SRAM 104 for maintaining data values. If the SRAM 104 is in use, then power is needed. On the other hand, if the SRAM 104 is not in use, then the power may be switched off to conserve power in battery 150. However, the SRAM 104 is volatile and stored data is lost when power is switched off. Memory controller 108 may be used to handle the interface-to-interface translation functions which translate the data from the memory bus 223 to the CPU bus 221.

The erase processes of non-volatile memory 105 and non-volatile memory card 106 may utilize high voltages (e.g., 10-13 volts) that erase a block of data at a time. This erase process may be time consuming. In some embodiments, for example, a user may enter a new contact on keypad 128. Analog ASIC 114 may convert the analog data into digital data and transfer it to digital baseband 110 for both display on LCD 140 and for storage of the digital data in non-volatile memory card 106. However, as mentioned previously, non-volatile, or FLASH, memory has drawbacks.

FLASH memory may use a driver, an operating system, and a pointer system. The driver may be used to translate the control parameters used to read, write and erase. The driver resides in CPU 110A to allow the CPU 110A to drive the FLASH I0. The complexity of the FLASH memory erase process results in the need for the operating system and pointer system. That is, a write operation sets certain bits to a 1 value, and an erase sets all bits in a block to a 0 value. However, writing a 0 to a location that already contains a 1 will have no effect. For example, a byte of written data (in hexadecimal notation) may contain 0×55 (0101 0101). If the system writes a complimentary pattern of 0×AA (1010 1010) the result is 0×FF (1111 1111) not the desired 0×AA because only the 1 data locations can be written. An erase operation is required in FLASH to set any bit values to 0. It is the operating system that utilizes the pointer system to manage the erase process.

The erase operation may be slow and as such the operating system, sometimes referred to as FLASH File System (FFS), may move data to minimize the number of erases. Data may be moved, that is, written to a new location, instead of performing an erase and write. The location to where the data is moved may be tracked by the pointer system. The pointer system may use overhead data such as markers and address pointer values that are stored in the FLASH memory. The FLASH memory may fill at a more rapid pace due to the moving of data and the storing of the overhead values Once a FLASH block is full or contains a large amount of obsolete data (i.e., data that has been moved to a new location) it may be scheduled for erasure. The good data in the block maybe moved to SRAM 104 or another FLASH block (e.g., non-volatile memory 105) so that it is retained. If FLASH is used, markers and address pointer values are stored. Then the scheduled erasure can take place. The erase process may include a cycle of erases and reads. The cycle of erases and reads may be continued until all the block values reach the erased state. The erase cycle is slow and uses high voltages for long periods of time which may cause high currents and battery drain. Once in the erased state, the block can accept a write. This multi-step process which includes moving data, tracking addresses, storing overhead values, and erasing, may cause FLASH memory to be slow and impacts the performance of the system as a whole. Moreover, other drawbacks to FLASH memory include the circuitry required to provide the high voltages and the power drain created by the high voltages. For portable devices, it is desirable to minimize power drain and reduce the area taken up by circuitry.

The CPU 110A may coordinate the power management 146 to provide power from battery 150 to non-volatile memory 105. When power is supplied to the non-volatile memory 105 and the memory is given an erase command, the internal circuitry in the non-volatile memory 105 activates causing the charge pumps to generate a high voltage and start the logic sequence.

In some embodiments, FLASH File System may run on the CPU 110, consuming a portion of the CPU 110A computing resources and memory. This burden on operating system 210 may be illustrated by FLASH File System load 220. FLASH File System also utilizes file manager 205, driver 225, and pointer system 245. File manager 205 may be configured to understand the file structure of the non-volatile memory 105 and may be used to translate data from the memory bus 223 to the CPU bus 221. Driver 225 may be used to determine the driving sequences for accessing non-volatile memory 105. Pointer system 245 keeps track of data as was described above.

Non-volatile memory card 106 functions similarly to non-volatile memory 105. The erase process of non-volatile memory 106 may utilize high voltages (e.g., 10-13 volts) that erase a block of data at a time. This erase process may be time consuming. FLASH File System software may be used for the purpose of data management of non-volatile memory card 106. FLASH File System software may be used to manage the slowness and the size of the erase by moving data between blocks to maximize data concentration and minimize quantity of erases, and manage the erase process itself.

Data blocks for non-volatile memory card 106 may be a different size than the block size for non-volatile memory 105. The CPU 110A may coordinate the power management 146 to provide power from battery 150 to non-volatile memory card 106. When power is supplied to the non-volatile memory card 106 and the memory is given an erase command, the internal circuitry in the non-volatile memory card 106 activates causing the charge pumps to generate a high voltage and start the erase logic sequence.

In one embodiment FLASH File System may run on the CPU 110A, consuming a portion of the CPU 110A computing resources and memory. This burden on operating system 210 may be illustrated by FLASH File System load 220. In another embodiment, FLASH File System may run on an on-board controller resident on non-volatile memory card 106. In this embodiment, the operating system 210 is configured to poll the on-board controller to determine if the FLASH memory is available, or busy (i.e., performing an erase operation). The polling function in the operating system may be represented by FLASH File System polling load 215. In either embodiment, the operating system 210 is loaded down with either the FLASH File System itself and with polling for the status of the on-board controller of FLASH memory, or in some other embodiments the CPU 110A is loaded down with both loads 215 and 220.

FLASH File System also utilizes file manager 205, driver 230, and pointer system 245. File manager 205 may be configured to understand the file structure of the non-volatile memory card 106 and may be used to translate data from the memory bus 223 to the CPU bus 221. Driver 230 may be used to determine the driving sequences for accessing non-volatile memory card 106.

There are several drawbacks to cellular telephone 100. There are several drawbacks to the conventional cellular telephone 100 and the conventional memory system 200. Battery 150 could fail while the data is being stored in volatile memory, such as the DRAM 102 or the SRAM 104, losing the data. The multiple memory types included have different operational methods and place different loads on CPU 110A causing inefficiencies. The erase operation for the non-volatile memories 105 and 106 result in slower system throughput and burden the CPU 110A with additional drivers, loads, and a pointer system. In addition, the plurality of the memory types may consume valuable space.

Non-volatile memory technologies may be used with memory systems to develop high density, low cost, and fast access memories. Access may refer to accessing and performing data operations (e.g., read, write, erase) on a memory or memory array. Preferably, a non-volatile, cross-point, high density memory array that uses direct memory access, has a fast read/write capability, and uses neither an erase process, nor any added code in the operating system is used to replace one or more of the aforementioned multiple memory types. Examples of non-volatile memory arrays may include two-terminal or three-terminal cross-point memory arrays configured as a single layer array or as multiple layer vertically-stacked arrays. An exemplary non-volatile two-terminal cross-point memory array is described in U.S. patent application Ser. No. 11/095,026, filed Mar. 30, 2005, and titled "Memory Using Mixed Valence Conductive Oxides," hereby incorporated by reference in its entirety and for all purposes. The application describes non-volatile third dimension memory cells that can be arranged in a cross-point array and describes a two terminal memory element that changes conductivity when exposed to an appropriate voltage drop across the two terminals. The memory element includes both a mixed ionic electronic conductor and a layer of material that has the bulk properties of an electrolytic tunnel barrier (i.e., properties of an electronic insulator and an ionic conductor). A voltage drop across the electrolytic tunnel barrier causes an electrical field within the mixed ionic electronic conductor that is strong enough to move oxygen ($O_2$) ions out of the mixed ionic electronic conductor and into the electrolytic tunnel barrier. Oxygen depletion causes the mixed ionic electronic conductor to change its conductivity. Both the electrolytic tunnel barrier and the mixed ionic electronic conductor do not need to operate in a silicon substrate, and, therefore, can be fabricated above circuitry being used for other purposes (e.g., selection circuitry, sense amps, and address decoders). A memory is "third dimension memory" when it is fabricated above other circuitry components, the components usually including a silicon substrate, polysilicon layers and, typically, metallization layers, for example.

The two-terminal memory elements can be arranged in a cross-point array such that one terminal is electrically coupled with an x-direction line and the other terminal is electrically coupled with a y-direction line. A stacked cross-point array consists of multiple cross-point arrays vertically stacked upon one another, sometimes sharing x-direction and y-direction lines between layers, and sometimes having isolated lines. When a first write voltage $V_{W1}$ is applied across the memory element, (typically by applying ½ $V_{W1}$ to the x-direction line and ½--$V_{W1}$ to the y-direction line) it switches to a low resistive state. When a second write voltage $V_{W2}$ is applied across the memory element, (typically by applying ½ $V_{W2}$ to the x-direction line and ½-$V_{W2}$ to the y-direction line) it switches to a high resistive state. Typically, memory elements using electrolytic tunnel barriers and mixed ionic electronic conductors require $V_{W1}$ to be opposite in polarity from $V_{W2}$. Typically, a magnitude of the voltage applied across the memory element for data operations (e.g., read or write) is less than approximately 10 volts. More preferably, the magnitude of the voltage applied across the memory element is less than approximately 7 volts.

In applications requiring high density data storage in a small footprint memory device, two-terminal cross-point memory arrays are preferable over three-terminal cross-point memory arrays because the extra area required to route the interconnect lines that electrically couple with the third terminal in the three-terminal cross-point memory array reduces areal density and increases die size and device footprint. Therefore, given the same die size, a two-terminal cross-point memory array will have a higher data storage density than the three-terminal cross-point memory array. A cellular telephone can incorporate one or more of the non-volatile cross-point memory arrays to replace some or all of the aforementioned multiple memory types (e.g., DRAM, SRAM, FLASH, FLASH memory cards, ROM and EEPROM).

Figure 2B:
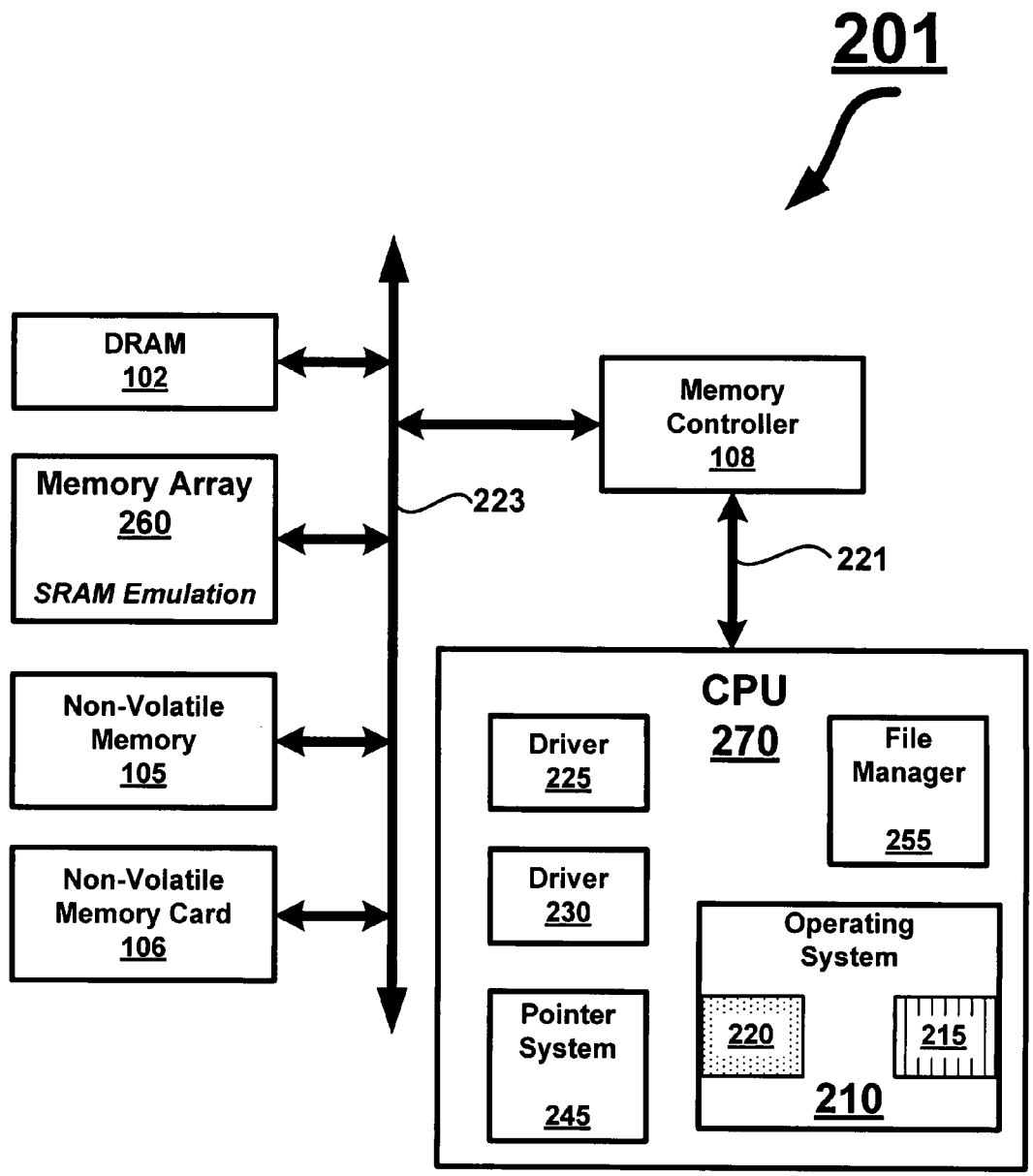
FIG. 2B is an exemplary representation of a memory system in a cellular telephone using a memory array to replace and emulate a SRAM.

The memory array can emulate multiple memory types and may be used to replace any one or combination of those types. For example, FIG. 2B is an exemplary representation of a memory system 201 in which a non-volatile memory array 260 may be used to replace and emulate SRAM 104. That is, non-volatile memory array 260 can be accessed randomly using PIO while eliminating the expense and size needs associated with SRAM 104. File manager 255 may be configured to understand the file structure of the non-volatile memory array 260 and may be used to translate data from the non-volatile memory array 260 to the CPU bus 221. Memory controller 108 may be used to perform interface functions for the non-volatile memory array 260. CPU 270 includes operating system 210 bearing polling and system loads 215 and 220 respectively, and pointer system 245. In the system 201, the SRAM 104 has been replaced with non-volatile memory array 260 thus eliminating the expense of SRAM while maintaining random access.

Figure 2C:
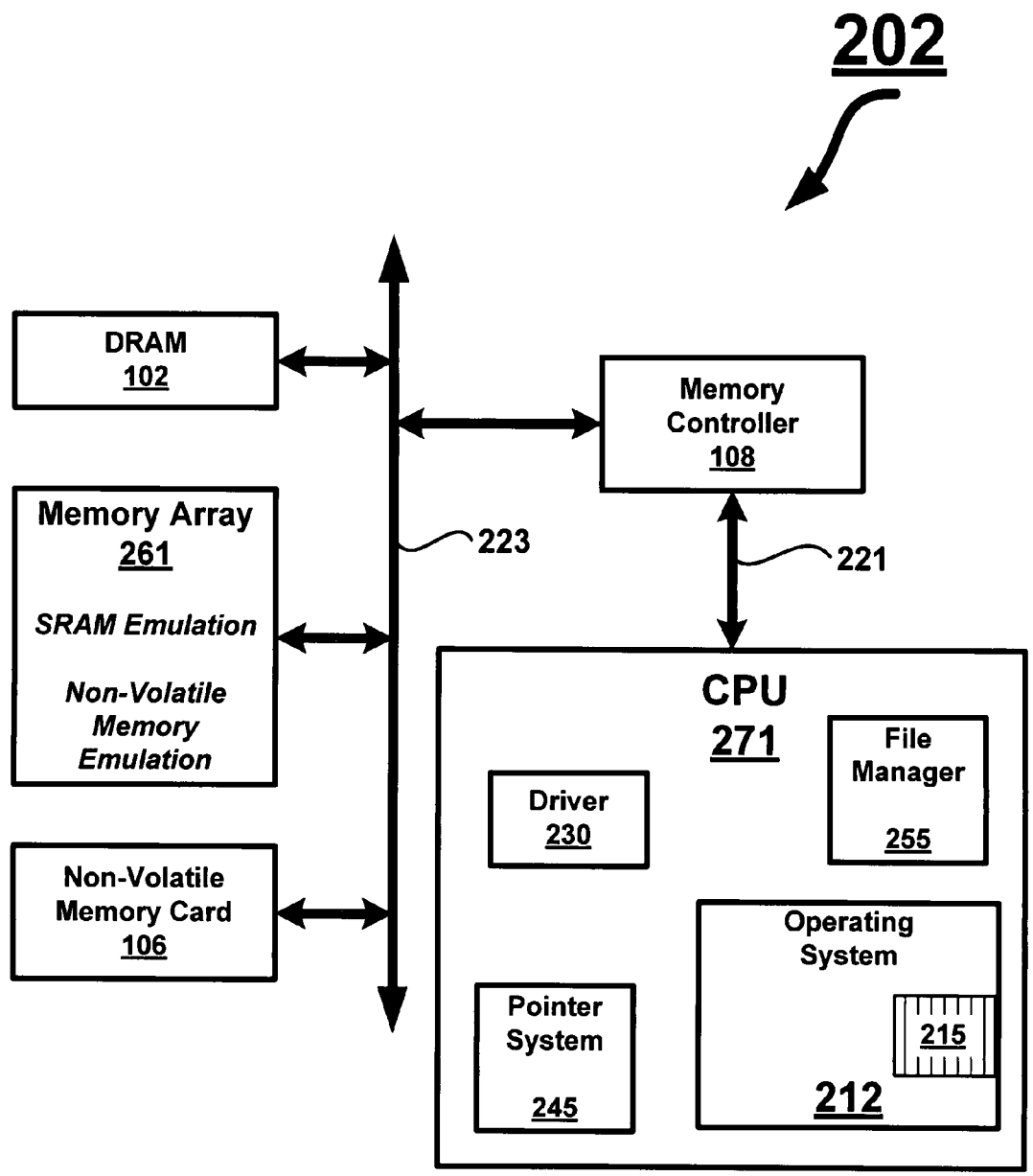
FIG. 2C is an exemplary representation of a memory system in a cellular telephone using a memory array to replace and emulate both a SRAM and a non-volatile memory.

FIG. 2C is an exemplary representation of a memory system 202 which a non-volatile memory array 261 may be used to replace and emulate a combination of SRAM 104 and non-volatile memory 105. That is, non-volatile memory array 261 can be accessed randomly using PIO while eliminating the expense associated with SRAM 104, or the erase operation such as that used with non-volatile memory 105, thus simplifying CPU 271 operations. File manager 255 may be configured to understand the file structure of the non-volatile memory array 261 and may be used to translate data from the non-volatile memory array 261 to the CPU bus 221. Memory controller 108 may be used to perform interface functions for the non-volatile memory array 261. CPU 271 includes operating system 212 bearing polling load 215. Note that the Flash File System load 220 has been eliminated from operating system 212. In the system 202, the SRAM 104 and the non-volatile memory 105 have been replaced with non-volatile memory array 261 thus eliminating the expense associated SRAM 104 and the erase operation associated with non-volatile memory 105 while maintaining fast random read/write access and adding non-volatile functionality to the memory by replacing the SRAM 104 with non-volatile memory array 261. In some embodiments, DMA functions may be maintained or added as well.

Figure 2D:
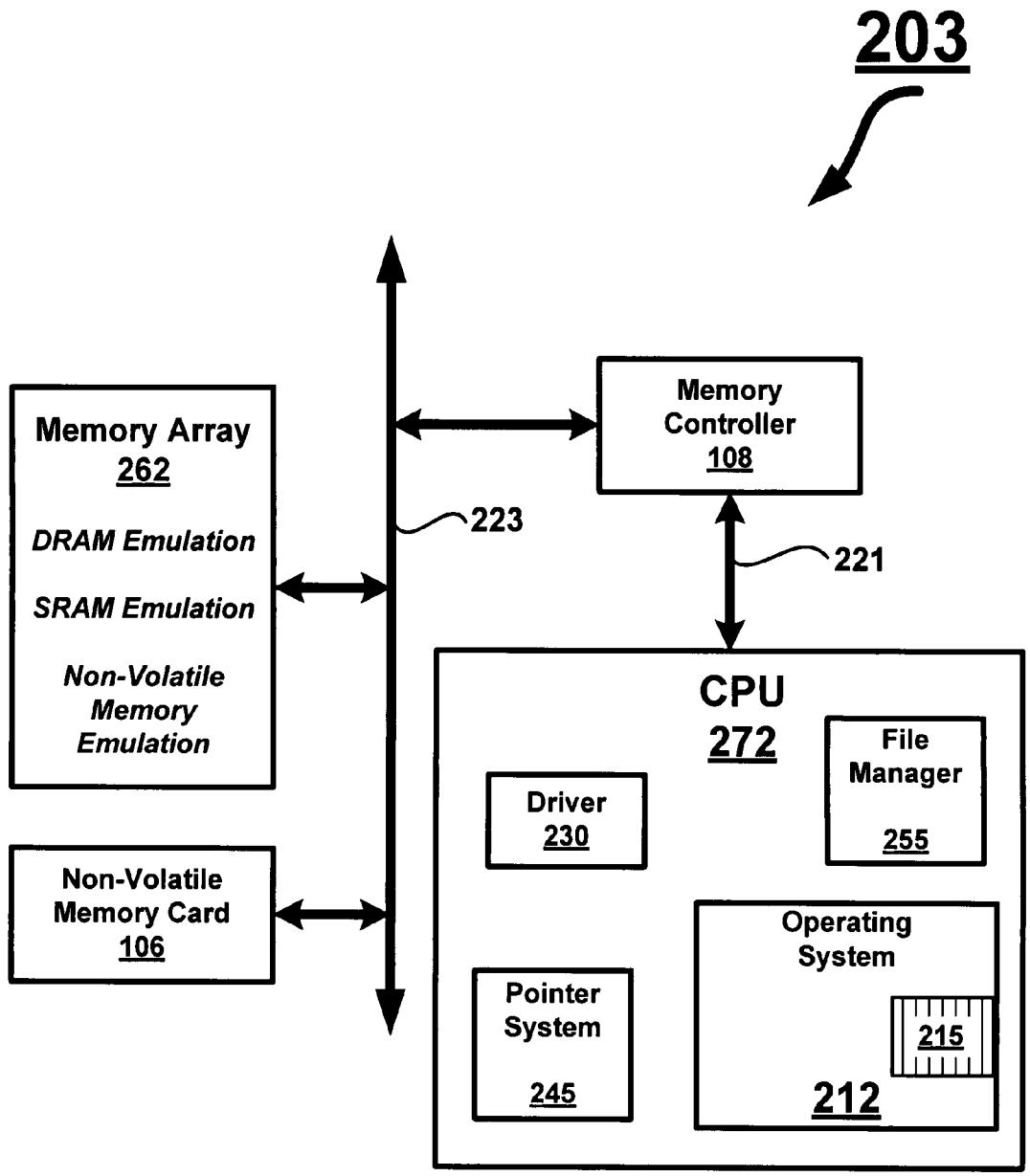
FIG. 2D is an exemplary representation of a memory system in a cellular telephone using a memory array to replace and emulate a DRAM, a non-volatile memory, and a SRAM.

FIG. 2D is an exemplary representation of a memory system 203 in which a non-volatile memory array 262 may be used to replace and emulate a combination of DRAM 102, non-volatile memory 105, and SRAM 104. That is, non-volatile memory array 262 can be accessed randomly using PIO while eliminating the need for either the refresh operation such as that used with DRAM 102, the erase operation such as that used with non-volatile memory 105, or selecting a subsection of memory for a particular purpose such as a scratchpad in the SRAM 104, thus simplifying operations for CPU 272. On the other hand, some implementations may use the non-volatile memory array 262 on the main bus with the non-volatile memory array 262 randomly accessed using direct cycle read and write operations with an address space of the non-volatile memory array 262 mapped as part of the main bus. File manager 255 may be configured to understand the file structure of the non-volatile memory array 262 and may be used to translate data from the non-volatile memory array 262 to the CPU bus 221. Memory controller 108 may be used to perform interface functions for the non-volatile memory array 262. CPU 272 may include file manager 255, non-volatile memory card 106, driver 230, and operating system 212 bearing polling load 215. Note that the Flash File System load 220 has been eliminated from operating system 212. In this system, the DRAM 102, the non-volatile memory 105, and the SRAM 104 have been replaced with non-volatile memory array 262 thus eliminating the need for the refresh operation associated with DRAM 102, eliminating the erase operation associated with non-volatile memory 105, and eliminating the expense associated with SRAM 104 while maintaining fast random DMA read/write access and adding non-volatile functionality in place of the volatile functionality of SRAM 104 and DRAM 102 memory. In some embodiments, DMA functions may be maintained or added as well.

Figure 2E:
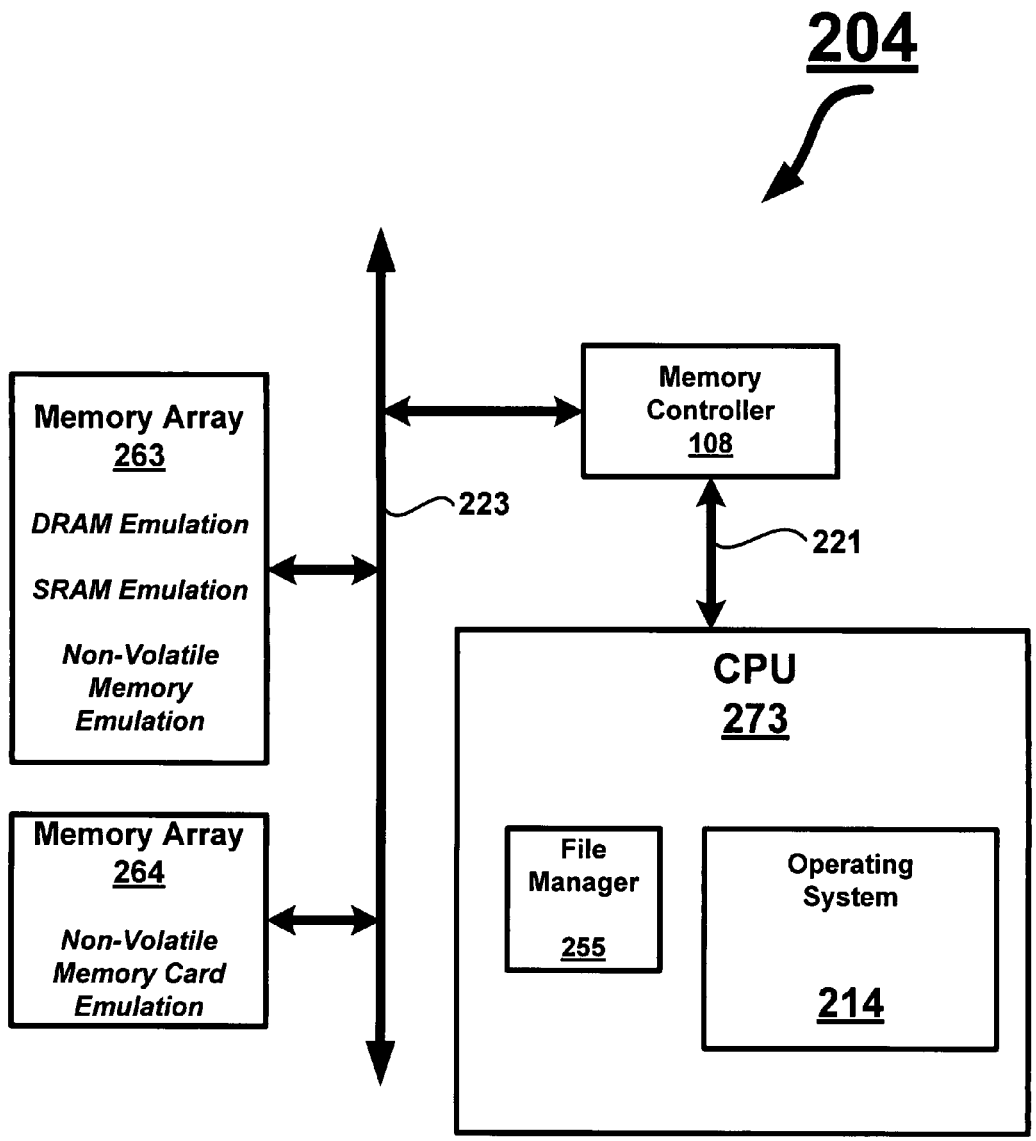
FIG. 2E is an exemplary representation of a memory system in a cellular telephone using a memory array to replace and emulate a DRAM, a non-volatile memory, a SRAM, and using a memory array card to replace and emulate a non-volatile memory card.

FIG. 2E is an exemplary representation of a memory system 204 in which a non-volatile memory array 263 may be used to replace and emulate a combination of DRAM 102, non-volatile memory 105, and SRAM 104, and a non-volatile memory array 264 may be used to emulate non-volatile memory card 106. That is, non-volatile memory array 264 may be accessed randomly using PIO while eliminating the need for erase operation such as that used with non-volatile memory card 106, thus simplifying operations for CPU 273. File manager 255 may be configured to understand the file structure of the non-volatile memory array 263 and the non-volatile memory array 264 and may be used to translate data from the non-volatile memory arrays 263 and 264 to the CPU bus 221. Memory controller 108 may be used to perform interface functions for non-volatile memory arrays 263 and 264. CPU 273 includes operating system 214. Note that the Flash File System load 220, polling load 215, and pointer system 245 have been eliminated from operating system 214. In this system, the DRAM 102, the non-volatile memory 105, and SRAM 104 have been replaced with non-volatile memory array 263, while non-volatile memory card 106 has been replaced with non-volatile memory array 264 thus eliminating the need for the refresh operation associated with DRAM 102, eliminating the erase operation associated with both the non-volatile memory 105 and non-volatile memory card 106, and eliminating the expense associated with SRAM 104 while maintaining fast DMA read/write access, portable storage features, and non-volatile memory functionality. In some embodiments the replacement of SRAM 104, DRAM 102, and non-volatile memory 105 (e.g., FLASH RAM) may be implemented using a single non-volatile memory array. In some other embodiments, the replacement of SRAM 104, DRAM 102, and non-volatile memory 105 (e.g., FLASH RAM) may be implemented using a plurality of separate non-volatile memory arrays.

Figure 3:
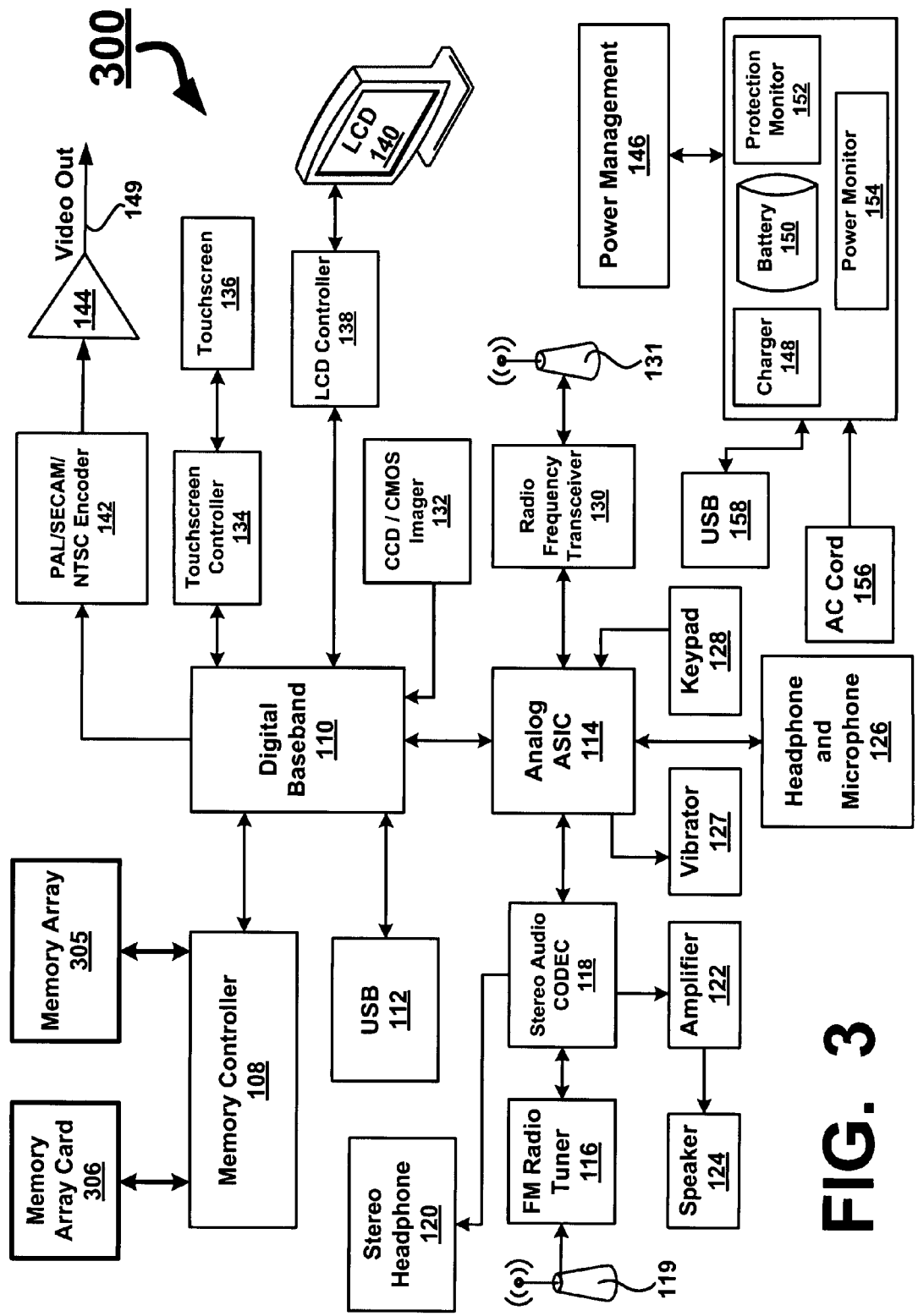
FIG. 3 is an exemplary representation of cellular telephone using a non-volatile memory array and a non-volatile memory array card to replace and emulate multiple memory types.

FIG. 3 is an exemplary representation of cellular telephone 300 using non-volatile memory array technology. Non-volatile memory array 305 has replaced and emulates DRAM 102, SRAM 104 and non-volatile memory 105, and non-volatile memory array card 306 has replaced and emulates the non-volatile memory card 106. This configuration uses directly accessed non-volatile memory arrays and therefore has eliminated inefficiencies in memory processing for cellular telephones. The refresh process has been eliminated. The erase process has been eliminated. The FLASH File System has been eliminated. The drivers for the FLASH memory have been eliminated. Data movement processes associated with FLASH memory have been eliminated. Elimination of baseband 110 burdening activity results in a more efficient cellular telephone 300. The replacement of the separate memory chips (e.g., 102, 104, 105, and 106) by fewer high density non-volatile memory array chips or a single non-volatile memory array chip may result in a more compact cellular telephone design.

One skilled in the art will appreciate that the cellular telephone 300 can include more than one removable non-volatile memory array card 306, for example, the cellular telephone 300 can include a plurality of card slots with each card slot operable to receive a removable non-volatile memory array card 306. The data storage capacity of the removable non-volatile memory array cards 306 need not be identical. The non-volatile memory array cards 306 can be configured to conform to industry standard form factors for removable memory cards, such as SD™, SDHC™, miniSD™, microSD™, microSDHC™, TransFlash™, CompactFlash®, and Memory Stick®, for example. Moreover, the cellular telephone 300 can include more than one non-volatile memory array 305. For example, one non-volatile memory array 305 can replace and emulate SRAM 104 and non-volatile memory 105 and another non-volatile memory array 305 can replace and emulate DRAM 102. A PC board or other structure in the cellular telephone 300 can include a plurality of memory slots (not shown) that allow for memory capacity to be increased or decreased by adding or removing non-volatile memory arrays 305 to/from available memory slots. As one example, in cellular telephone where DRAM is replaced and emulated by non-volatile memory array 305, emulated DRAM storage capacity can be increased by adding one or more additional non-volatile memory arrays 305 to available memory slots. Data stored in the non-volatile memory array(s) can include but is not limited to file data, image data, audio data, compressed data, packet data, video data, program data, and executable code data, just to name a few.

What is claimed is:

1. A cellular telephone, comprising:
a digital baseband processor including a central processing unit (CPU), the CPU including an operating system (OS) and a file manager;
an application specific integrated circuit (ASIC) electrically coupled with the digital baseband processor;
a memory controller electrically coupled with the digital baseband processor, the CPU electrically coupled with the memory controller via a CPU bus; and
a non-volatile two-terminal cross-point memory array that is directly accessed for data operations, the non-volatile two-terminal cross-point memory array is electrically coupled with the memory controller and is operative to store data in a plurality of memory elements with each memory element having exactly two terminals and configured to store the data as a plurality of resistive states and is operative to replace and emulate both volatile and non-volatile memory and is configured for write operations without a FLASH File System (FFS) and without a FLASH erase operation prior to a write operation,
wherein the OS is configured to coordinate memory I/O functions without FLASH polling loads, without FLASH system loads, and without a FLASH pointer system, and
wherein the file manager is specifically configured to understand a file structure of the non-volatile two-terminal cross-point memory array and to translate data from the non-volatile two-terminal cross-point memory array to the CPU bus.

2. The cellular telephone of claim 1, wherein the non-volatile two-terminal cross-point memory array is randomly accessed.

3. The cellular telephone of claim 1, wherein the memory controller includes a direct memory access (DMA) channel, the processing unit includes a file manager, and the data is accessed by the DMA channel operating in cooperation with the file manager.

4. The cellular telephone of claim 1, wherein the non-volatile two-terminal cross-point memory array is vertically stacked.

5. The cellular telephone of claim 1, wherein data operations to the non-volatile two-terminal cross-point memory array occur at a potential difference that is less than approximately 10 volts.

6. The cellular telephone of claim 1, wherein the data is retained in the absence of electrical power.

7. The cellular telephone of claim 1, wherein the non-volatile two-terminal cross-point memory array is operative to replace and to emulate a memory type selected from the group consisting of dynamic random access memory (DRAM), static random access memory (SRAM), non-volatile random access memory (FLASH), a removable non-volatile memory card, and any combination of those memory types.

8. The cellular telephone of claim 7, wherein the data is retained without a refresh operation to the non-volatile two-terminal cross-point memory array.

9. The cellular telephone of claim 7, wherein the data is retained in the absence of electrical power.

10. The cellular telephone of claim 7, wherein the non-volatile two-terminal cross-point memory array is operative to perform consecutive write operations without performing the FLASH erase operation prior to each write operation in the consecutive write operations.

11. The cellular telephone of claim 7, wherein the data is retained when removable non-volatile memory card is removed from the cellular telephone.

12. The cellular telephone of claim 7, wherein the non-volatile two-terminal cross-point memory array is vertically stacked.

13. The cellular telephone of claim 1, wherein the cellular telephone is a component of a device selected from the group consisting of a mobile phone, a personal digital assistant (PDA), an electronic organizer, a device including electronic organizer functionality, a portable electronic device, a computer, and any combination of those devices.

14. The cellular telephone of claim 1, wherein the ASIC is an analog ASIC.

15. The cellular telephone of claim 1, wherein a portion of the non-volatile two-terminal cross-point memory array is used as a scratch pad by the digital baseband processor.

16. A cellular telephone, comprising:
a digital baseband processor including a central processing unit (CPU), the CPU including an operating system (OS) and a file manager;
an application specific integrated circuit (ASIC) electrically coupled with the digital baseband processor;

a memory controller electrically coupled with the digital baseband processor, the CPU electrically coupled with the memory controller via a CPU bus; and a plurality of non-volatile two-terminal cross-point memory arrays that are directly accessed, the plurality of non-volatile two-terminal cross-point memory arrays are electrically coupled with the memory controller and are operative to store data in a plurality of memory elements with each memory element having exactly two terminals and configured to store the data as a plurality of resistive states, the plurality of non-volatile two-terminal cross-point memory arrays are operative to replace and emulate both volatile and non-volatile memory, the plurality of non-volatile two-terminal cross-point memory arrays are configured for write operations without a FLASH File System (FFS) and without a FLASH erase operation prior to a write operation, the data is retained in the absence of electrical power, and at least one of the plurality of non-volatile two-terminal cross-point memory arrays comprises a removable non-volatile memory car, wherein the OS is configured to coordinate memory I/O functions without FLASH polling loads, without FLASH system loads, and without a FLASH pointer system, and wherein the file manager is specifically configured to understand a file structure of the plurality of non-volatile two-terminal cross-point memory assays and to translate from the plurality of non-volatile two-terminal cross-point memory arrays to the CPU bus.

17. The cellular telephone of claim 16, wherein the memory controller includes a direct memory access (DMA) channel, and the data is accessed by the DMA channel operating in cooperation with the file manager.

18. The cellular telephone of claim 16, wherein data operations to the plurality of non-volatile two-terminal cross-point memory arrays occur at a potential difference that is less than approximately 10 volts.

19. The cellular telephone of claim 16, wherein at least one of the plurality of non-volatile two-terminal cross-point memory arrays is vertically stacked.

20. The cellular telephone of claim 16, wherein at least one of the plurality of non-volatile two-terminal cross-point memory arrays is randomly accessed.

21. The cellular telephone of claim 16, wherein at least one of the plurality of non-volatile two-terminal cross-point memory arrays is operative to replace and to emulate a memory type selected from the group consisting of dynamic random access memory (DRAM), static random access memory (SRAM), non-volatile random access memory (FLASH), and any combination of those memory types.

22. The cellular telephone of claim 21, wherein the data is retained without a refresh operation to the at least one of the plurality of non-volatile two-terminal cross-point memory arrays.

23. The cellular telephone of claim 21, wherein the at least one of the plurality of non-volatile two-terminal cross-point memory arrays is operative to perform consecutive write operations without performing the FLASH erase operation prior to each write operation in the consecutive write operations.

* * * * *